US009687013B2

United States Patent
Claussen et al.

(10) Patent No.: US 9,687,013 B2
(45) Date of Patent: Jun. 27, 2017

(54) METHOD FOR THE MANUFACTURE OF PRE-RIGOR SAUSAGE

(71) Applicant: Tyson Foods, Inc., Springdale, AR (US)

(72) Inventors: Craig Matthew Claussen, Springdale, AR (US); Brent Robert McElroy, Cedar Falls, IA (US); Brady Thomas Wilson, Waterloo, IA (US); Daniel Jason Boetel, Lowell, AR (US); Harry Y. Chu, Fayetteville, AR (US); Jace Joseph Hollenbeck, Springdale, AR (US)

(73) Assignee: Tyson Foods, Inc., Springdale, AR (US)

( * ) Notice: Subject to any disclaimer, the term of this patent is extended or adjusted under 35 U.S.C. 154(b) by 348 days.

(21) Appl. No.: 14/262,963

(22) Filed: Apr. 28, 2014

(65) Prior Publication Data

US 2015/0305351 A1   Oct. 29, 2015

(51) Int. Cl.
  *A22C 11/00*   (2006.01)
  *A23L 1/317*   (2006.01)
  *A23L 13/60*   (2016.01)

(52) U.S. Cl.
  CPC ............. *A23L 1/3175* (2013.01); *A23L 13/65* (2016.08)

(58) Field of Classification Search
  CPC ..................................................... A23L 13/65
  USPC ........................................ 426/646, 388, 149
  See application file for complete search history.

(56) References Cited

FOREIGN PATENT DOCUMENTS

| CN | 101637276 A | * | 2/2010 |
| DE | 202008001424 U1 | * | 6/2008 |
| KR | 20100013608 A | * | 2/2005 |
| RU | 2166870 C1 | * | 5/2001 |

* cited by examiner

*Primary Examiner* — Vera Stulii
(74) *Attorney, Agent, or Firm* — Mark E. Stallion, Esq.; Husch Blackwell LLP

(57) ABSTRACT

A method for economically retrieving pre-rigor lean and fat for pork sausage from a butcher hog; barrow (a male pig that has been castrated) or gilt (female pig less than six months old that has never been pregnant), (a pig approximately 285 lbs live weight, 6 months old and ready for market with no abnormalities). Retrieving pre-rigor pork sausage from a butcher hog is not known currently in the industry because the perception is that it is not economically feasible. The process technology as disclosed and claimed herein is a new method for economically retrieving and processing certain sections of a butcher hog for producing ground pork sausage while maintaining the value from the primal cuts. The ground pork sausage from this process has comparable texture, color, consistency and other characteristics as compared to the pork sausage retrieved from the older sows, which are typically utilized in industry. In the present technology as disclosed and claimed herein, the process harvests certain sections from butcher hogs at 1 hour to 1 hour and 45 minutes post mortem. The process harvests certain sections of the butcher hog pre-rigor meat including the picnic, jowl, cheek meat, temple, head back, pate and trace lean.

16 Claims, 2 Drawing Sheets

PORK SHOULDER—PICNIC

METHOD FOR THE MANUFACTURE OF PRE-RIGOR SAUSAGE

BACKGROUND

Field

This technology relates generally to the manufacture of pork sausage and, more particularly, to manufacture of pre-rigor sausage.

Background Art

Historically it is common to cut and remove meat from an animal carcass soon after slaughter. This system of processing is still practiced particularly where refrigeration resources are at a premium. However, even in the United States some animal carcasses are cut soon after slaughter. In countries like the United States where energy has been plentiful, refrigeration became so abundant that the meat industry adopted facilities that were extensively equipped with abundant refrigeration resources which were not necessarily economical or best for the meat product being cooled. A combination of these facilities having plentiful refrigeration and the practice of chilling, reheating, and re-chilling tons of product each day, created the need for an efficient processing systems became evident. There should be processing efficiency along with production efficiency to provide the consumer with the best quality at the lowest price. Hot processing helps to achieve this goal.

The pork sausage industry utilizes a short processing period from slaughter to the chilled or frozen package. The system makes raw seasoned sausage in less than 90 minutes after slaughter. This process not only takes advantage of economics in processing and chilling, but provides the consumer with a sanitary, longer shelf-life product. The majority of the raw pork sausage industry now uses pre-rigor pork. The raw pork sausage industry uses sows (a female swine that has farrowed one or more litters of pigs) with the proper ratio of fat to lean. This careful selection of the animal makes it possible to blend a product without a great amount of excess fat. Lean meat and fat are separated from the bone, chopped into uniform pieces, partially cooled, seasoned, ground, and stuffed into grease-proof casings in a matter of minutes. The chubs are then cooled using an ethylene glycol bath system or other cooling system. Pork sausage links can be extruded with or without casing. The links can then be refrigerated. The case hardened links are then packaged and tempered. Pork tissue (lean and fat) to be used for further manufacture is generally salted (2-4 percent) during the coarse chopping step and then placed in boxes or other containers to be frozen. The pre-salted meat is used in sausage manufacture because of its ability to yield actin and myosin for binding. Even though pre-rigor pork has been shown to have numerous advantages, the industry has been reluctant to process animal cuts directly from the slaughter floor without some cooling.

The pork industry has been reluctant to adopt hot processing for primal cuts for butcher hogs; barrow (a male pig that has been castrated) or gilt (female pig less than six months old that has never been pregnant), but have utilized hot boning for the manufacture of sausage using sows where the meat from entire animal carcass is utilized for the sausage. However, it would not be economically practical to use the same process for butcher hogs for processing sausage where the meat from the entire carcass is utilized because the primal cuts for the butcher hog carries a higher value than it would if it were ground into sausage. Although, hot processing of meat offers several economical advantages which result from reduction of weight loss during chilling (about 1.5%), reduction of drip loss during storage of vacuum-packaged cuts by 0.1-0.6%, reduction in cooler space by 50-55%, savings of refrigeration energy by 40-50%, quicker turnover of meat at plant, reducing capital cost for buildings, higher final yield of products manufactured from hot-boned meat, savings on labor by 20% and savings on transport costs.

Hot-boned meat offers numerous advantages in the production of comminuted meat products, attributed to higher muscle pH, higher protein solubility and increased emulsifying capacity. Due to higher pH and Residual ATP level, and better solubility of myofibrillar proteins, functional properties of hot-boned meat are superior to those of cold-boned meat. Hot-processing resulted in higher fat retention during cooking than does cold-processing of ground pork and the patties made from hot-boned pork had higher cooking yield and more desirable pink/red color which might be associated with its higher ultimate pH. Studies have shown that, not only hot-boned meat but also hot-boned fat could increase the final yield. Therefore, it is well understood that the superior functional properties of hot-boned meat are mostly due to its higher pH and protein solubility. However, hot-boning butchered hogs for the manufacture of sausage rather than using the older sows is not economically practical because the primal cuts of a butchered hog has a greater return in value than would be gained by grinding the primal cuts of a butchered hog into ground sausage. One objective of the present invention as disclosed and claimed herein is to capture the benefits of hot-boning at least a portion of a butchered hog and capture the greater return in value for the primal cut, while also retrieving a ground sausage product from the butchered hog without effecting the return on value for the primal cuts.

BRIEF SUMMARY

The invention is a method for economically retrieving pre-rigor pork sausage from a butcher hog; barrow (a male pig that has been castrated) or gilt (female pig less than six months old that has never been pregnant), (a pig approximately 285 lbs live weight, 6 months old and ready for market with no relevant abnormalities), which is a category of hog well known by those skilled in the art. Retrieving pre-rigor pork sausage from a butcher hog is not known currently in the industry because the perception is that it is not economically feasible as outlined in the background. Pork sausage, whether pre-rigor or not is retrieved from older sows because they are not typically used for the butchering of primal cuts because of the difference in the meat quality as compared to the younger and smaller butcher hogs. Whole hog sow meat is used for ground sausage, however, use of whole butcher hog meat is not believed to be economically feasible in the industry. The process technology as disclosed and claimed herein is a new method for economically retrieving and processing certain sections of a butcher hog for producing ground pork sausage while maintaining the value from the primal cuts. The ground pork sausage from this process has comparable texture, color, consistency, shelf life and other characteristics as compared to the pork sausage retrieved from the older sows, thereby meeting customer expectations. In the present technology as disclosed and claimed herein, the process harvests certain sections from butcher hogs at about approximately 1 hour to 1 hour and 45 minutes (the range can be larger for example in the Range of about approximately 30 minutes-120 minutes) post mortem. The process harvests certain sections of the butcher hog pre-rigor meat including the picnic, see FIG.

3 (subscapularis, supraspinatus, pectoralis profundi, infraspinatus, teres major, triceps brachii), jowl (pork fat), cheek (masseter), temple (head meat from the side of the head), head back (head meat from the back of the head), pate (head meat trimmed from between the ear cartilage) and trace lean (Leaf lard—Visceral fat deposit surrounding the kidneys and inside the loin). The cut for the picnic is on the picnic side of the arm bone/shoulder joint and the cut goes up through the first two ribs to include the; subscapularis, supraspinatus, pectoralis profundi, infraspinatus, teres major, triceps brachii. The following URL provides insight into the various specifics regarding the portions.
http://porcine.unl.edu/pages/
index.jsp?what=subprimal&hs=Ham&subprimalId=15

The foot is removed from the picnic/jowl and the picnic/jowl is skinned and deboned. In addition, the process could harvest certain sections of the butcher hog for pre-rigor meat that includes the whole pork shoulder; Picnic, Cushion and Boston Butt. The process is performed such that the shoulder is separated from the side by a straight cut that is approximately perpendicular to the length of the side. The shoulder/picnic cut shall be made posterior to the elbow, but not more than 1.0 inch from the tip of the elbow. The foot is removed and the pork shoulder is skinned and deboned. The following URL provides further insight on the specifics of the muscle complex.
http://porcine.unl.edu/porcine2005/pages/
index.jsp?what=subprimal&hs=Ham&subprimalId=15

Due to the possible limited real time flow of head meat raw material, it could be collected, chopped, salted and chilled the day before it is used in the ground sausage blend/formula. The picnic/jowl meat can be hot boned where the temperature of the meat is at 97° to 105° Fahrenheit (however the temperature of the meat can be within approximately the Range of 80°-110° F.). During the hot bone process, the temple meat can be removed from the head and collected for hot chopping at a temperature at about 87° to 90° Fahrenheit (however the temperature of the meat can be within approximately the Range of 80°-110° F.). The head back meat can be removed from the head and collected for hot chopping at a temperature at about 90° to 93° Fahrenheit (however the temperature of the meat can be within approximately the Range of 80°-110° F.). The cheek meat can be removed from the head and collected for hot chopping at a temperature at about 94° to 95° Fahrenheit (however the temperature of the meat be within approximately the Range of about 80°-110° F.). The hot meat can be passed on to a bowl chopper or similar device for processing the pre-rigor meat.

The temperature of the picnic jowl at chopper can be about 94-95° F. (however the temperature of the meat can be within approximately the Range of about 80°-110° F.). The temperature of the temple at the chopper can be about 83-86° F. (however the temperature of the meat can be within approximately the Range of about 80°-110° F.). The temperature of the Head Back at the chopper can be about 86-88° F. (however the temperature of the meat can be within approximately the Range of about 80°-110° F.). The temperature of the Cheek Meat at the chopper can be about 88-89° F. (however the temperature of the meat can be within approximately the Range of about 80°-110° F.). After chopping the hot meat can then be salted and chilled in the chopper to less than about approximately 45°. The chilled, chopped, and salted pre-rigor meat is conveyed to the blender and further chilled to 27° F. (however the temperature of the meat can be within approximately the Range of about 20°-35° F.).

The technology for the process disclosed and claimed herein

These and other advantageous features of the present invention will be in part apparent and in part pointed out herein below.

BRIEF DESCRIPTION OF THE DRAWINGS

For a better understanding of the present invention, reference may be made to the accompanying drawings in which.

Figure 1:
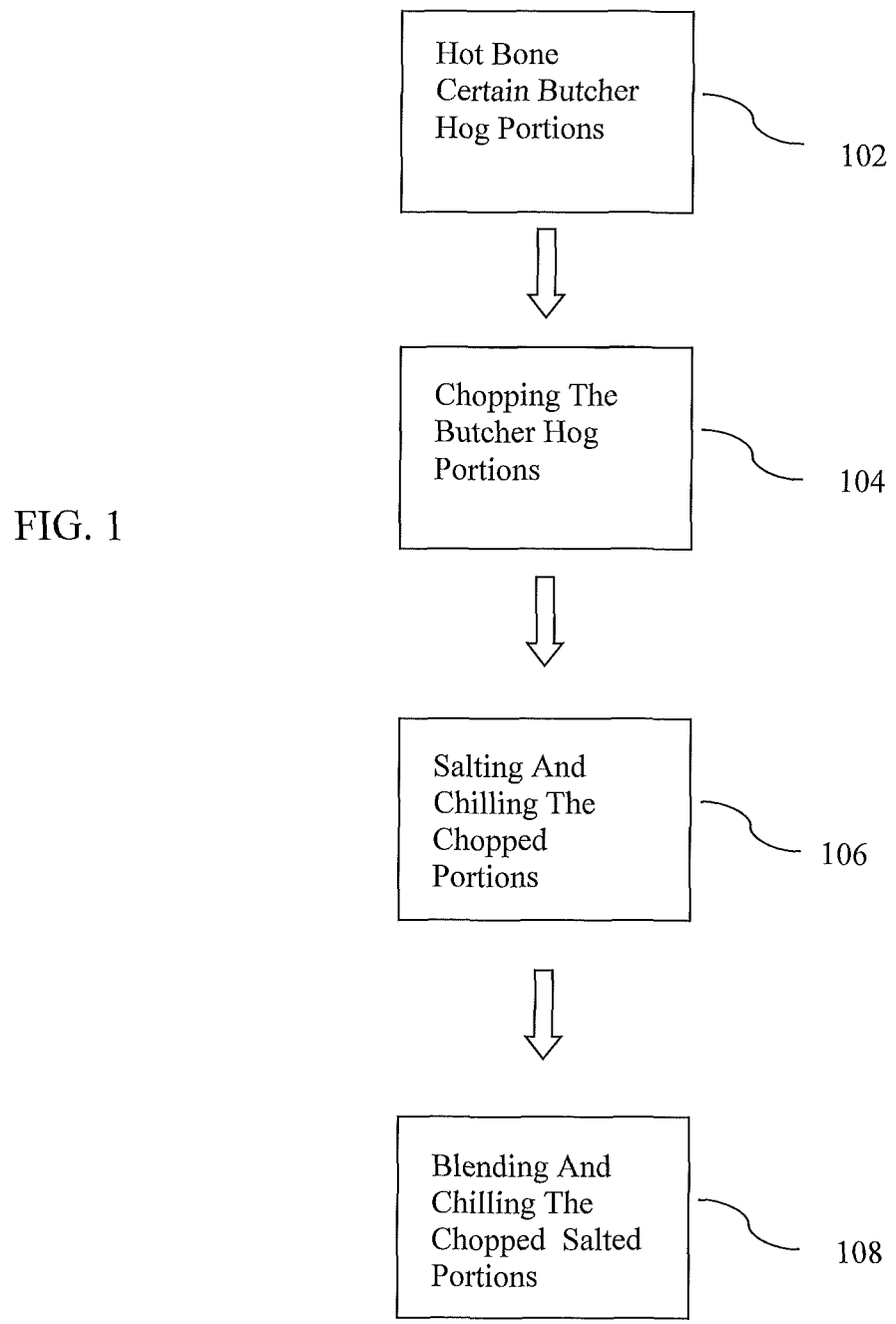
FIG. 1 is flow diagram for processing pre-rigor pork sausage.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

Figure 2:
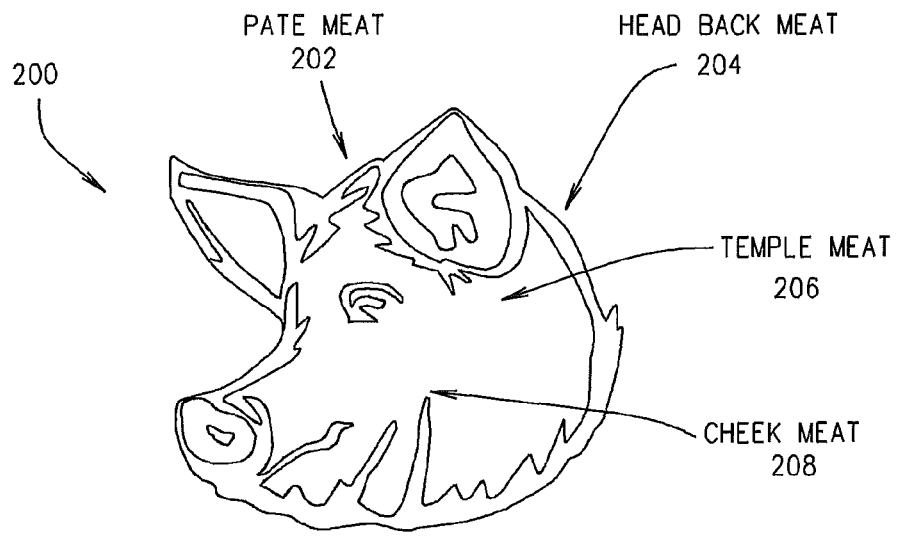
FIG. 2 is an illustration for the head portions.
Figure 3:
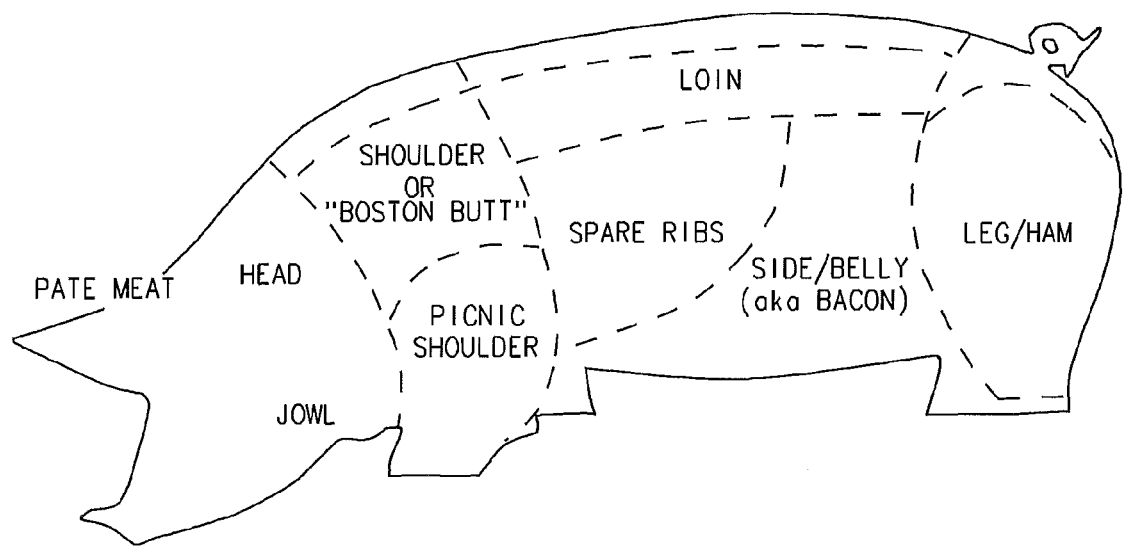
FIG. 3 is an illustration of the picnic-shoulder.

According to the embodiment(s) of the present invention, various views are illustrated in FIG. 1-3 and like reference numerals are being used consistently throughout to refer to like and corresponding parts of the invention for all of the various views and figures of the drawing. Also, please note that the first digit(s) of the reference number for a given item or part of the invention should correspond to the FIG. number in which the item or part is first identified.

One embodiment of the present technology comprising method for manufacturing pork sausage teaches a novel method for manufacturing pork sausage from a butcher hog using certain portions of the butcher hog as part of a hot bone pre-rigor process.

The details of the invention and various embodiments can be better understood by referring to the figures of the drawing. Referring to FIG. 1, FIG. 2 and FIG. 3 the picnic/jowl meat can be hot boned 102 where the temperature of the meat is at 97° to 105° Fahrenheit (however the temperature of the meat can be within approximately the Range of about 80°-110° F.). During the hot bone process, the temple meat 206 can be removed from the head and collected for hot chopping at a temperature at about 87° to 90° Fahrenheit (however the temperature of the meat can be within approximately the Range of about 80°-110° F.). The head back meat 204 and pate meat 202 can be removed from the head and collected for hot chopping at a temperature at about 90° to 93° Fahrenheit (however the temperature of the meat can be within approximately the Range of about 80°-110° F.). The cheek meat 208 can be removed from the head and collected for hot chopping at a temperature at about 94° to 95° Fahrenheit (however the temperature of the meat can be within approximately the Range of about 80°-110° F.). The hot meat can be passed on to a bowl chopper or similar device for processing 104 the pre-rigor meat.

The temperature of the picnic jowl at chopper can be about 94-95° F. (however the temperature of the meat can be within approximately the Range of about 80°-110° F.). The temperature of the temple at the chopper can be about 83-86° F. (however the temperature of the meat can be within approximately the Range of about 80°-110° F.). The temperature of the Head Back at the chopper can be about 86-88° F. (however the temperature of the meat can be within approximately the Range of about 80°-110° F.). The temperature of the Cheek Meat at the chopper can be about 88-89° F. (however the temperature of the meat can be within approximately the Range of about 80°-110° F.). After chopping the hot meat can then be salted and chilled 106 in the chopper to less than 45°. The chilled, chopped, and salted pre-rigor blend is conveyed to the blender and further chilled 108 to about approximately 27° F. (however the temperature of the meat can be within approximately the Range of about 20°-35° F.).

The method for pre-rigor collection and bowl chop can generally include a lean chopper collection step and a fat chopper collection step. The output collected from these steps can be blended 108 in the desired proportions. In the Lean Chopper Collection step, lean is separated and collected from specific portions, including the Hot de-bone picnic; and the Hot de-bone cheek meat. The lean can be collected from these portions for about approximately 60-90 minutes post mortem (However, the Range can be about approximately 30-120 minutes post-mortem). The Lean Meat Block Formulation can include about approximately 50% (however the Range can be about approximately 30-70%) Picnic and 50% (however the Range can be about approximately 30-70%) Cheek lean meat. The lean can be scaled by proportion and added to the bowl chopper and the chopping process can begin. Salt can be added to the lean during this process of chopping at about approximately 1.5% (however the Range can be about approximately 0-2%) of total batch weight. The chopping process can continue until piece size of the lean is at about approximately ½". The chopped lean can be chilled with $CO_2$ to about approximately 30-35° F. The chilled lean can be discharged into a combo and held for up to 72 hours prior to inputting into the final blend. The target can be in the range of about approximately 10-14% blend fat.

In the Fat Chopper Collection step, fatty portions can be collected from specific portions including the Hot de-bone pate, including trimming ear cartilage and glands, the Hot de-bone head back, the Hot de-bone temple, the Hot de-bone trace lean. The fatty portions can be separated and similarly collected for about approximately 60-90 minutes post mortem (However the Range can be about approximately 30-120 minutes post-mortem). The Fat Meat Block Formulation can include about approximately 21.2% (However can be in the Range of about 15-25%) Head Back, 24.8% (However can be in the Range of about 15-25%) Temple, 35.4% (However can be in the Range of about 25-40%) Trace Lean (which targets the natural fall). The fatty portions are scaled and added to the bowl chopper. The chopping begins and salt at 1.5% (However can be in the Range of about Range 0-2%) of total batch weight can be added during the chopping process. Chopping can continue until the piece size of the fatty portions are at about approximately ½". The chopped fatty portions can be chilled with CO2 to 30-35° F. The chopped and chilled fatty portions can be discharged into a combo and held for up to 72 hours. The target range can be at about approximately 24-28% Ready To Use (RTU) fat. RTU denoting already chopped and salted.

Alternate method identified due to improved operational efficiency. The method for pre-rigor collection and bowl chop can generally include a natural fall chopper collection step. The output collected from this step can be blended in the desired proportions. In the natural fall Chopper Collection step, pre-rigor meat is separated and collected from specific portions, including the Hot de-bone picnic, Hot de-bone jowl, Hot de-bone cheek meat, Hot de-bone pate, Hot de-bone head back and the Hot de-bone temple. The meat can be collected from these portions for about approximately 60-90 minutes post mortem (Range 30-120 minutes post-mortem). The Meat Block Formulation can include about approximately 72.3% Picnic, 17.71% Jowl, 5.16% Cheek meat, 1.39% Pate, 1.59% Head Back and 1.85% Temple. The components can be scaled by proportion and added to the bowl chopper and the chopping process can begin. Salt can be added to the meat during this process of chopping at about approximately 1.5% (Range 0-2% salt) of total batch weight. The chopping process can continue until piece size of the lean is at about approximately ½". The chopped pre-rigor meat can be chilled with $CO_2$ to about approximately 30-35° F. The chilled lean can be discharged into a combo and held for up to 72 hours prior inputting into the final blend. The target can be in the range of about approximately 21.7-25.7% RTU fat.

Various blends and percentages of the outputs from the Lean Chopper Collection and the Fat Chopper Collection or natural fall collection steps can be utilized and will vary primarily based on the type of product being produced, including producing a sausage patty product, a sausage link product, a sausage chub, a sausage grind and a dinner brat sausage link product.

For the sausage patty process, the procedure can include dumping the pre-rigor lean meat into the holding hopper, and dumping the pre-rigor fat meat into the holding hopper and measuring the fat % of the components. Pre-rigor lean and pre-rigor fat can be added to the final blender targeting about approximately 22% (or in the Range of about 5-26%) Meat Block fat. At this time various seasoning, salt and water can be added. The inputs can be blended for about approximately 1 to 5 minutes and then chilled to about approximately 27° F. (or in the Range of about 20°-35° F.). The blended and chilled product can be discharged into a stuffer having an In-line grind to about approximately 2 to 4 mm. The product can be stuffed into slicing slicks having a target of about approximately 1.5" to 4" diameter. The slicks can be chilled to about approximately 19-26° F. The casing can be removed and the slicks can be placed into a slicer. The product can be sliced to about approximately 1.0 oz to 4.0 oz. The slice patties can be placed on a tray and overwrapped with a label and place in the master case.

For the Breakfast Sausage Link process, the pre-rigor lean meat can be dumped into the holding hopper and the pre-rigor fat meat can be dumped into the holding hopper. The fat % of the components can be measured. Pre-rigor can be added to the blender and the blend can have a 22% (or in the Range about 18-50%) target Meat Block fat. Seasoning, salt and water can be added and the product can be blended for about approximately 1 to 5 minutes. The blended product can be chilled to about approximately 27° F. (Range 20-35). The blended and chilled product can be discharged into the stuffer having an In-line grind to 2.0 to 4.0 mm. The product can be stuffed into a 18 to 25 mm collagen casing and having a target length of about approximately 3.0" to 4.0" and a target weight of about approximately 0.8 oz to 2.0 oz. The links can be place on a tray and overwrap, labeled and place in the master case.

For the Sausage Chub process the pre-rigor lean meat can be dumped into the holding hopper. Frozen trace lean can be course ground at about approximately ½", and fresh lean trim can be course ground at about approximately ½". Pre-rigor meat, frozen fat and fresh lean can be added to the blender with a target at about approximately 34% (in the range of about approximately 20-50%) Meat Block fat and at a target of about approximately 82% (or in the Range of about approximately 60-100%) pre-rigor meat. Seasoning, salt and water can be added when blending and can blend for about approximately 1 to 5 minutes. The product can be discharged into the stuffer having an In-line grind to 2 to 4 mm and stuffed having a length at about approximately 5" to 12", and a diameter at about approximately 2.50-2.60", and a weight at about approximately 16 to 32 oz. The chubs can be placed in the master case.

For the sausage grind process, the procedure can include dumping the pre-rigor lean meat into the holding hopper, and dumping the pre-rigor fat meat into the holding hopper and measuring the fat % of the components. Pre-rigor lean and pre-rigor fat can be added to the final blender targeting about approximately 22% (or in the Range of about 18-26%) Meat Block fat (Maximum blend fat of 50%). At this time various seasoning, salt and water can be added. The inputs can be blended for about approximately 3 minutes (or in the Range of about 1-5 minutes) and then chilled to about approximately 27° F. (or in the Range of about 20°-35° F.). The blended and chilled product can be discharged into a stuffer having an In-line grind to about approximately 3.5 mm (or in the Range of about 2.0-4.0 mm). The product can be extruded onto a tray, overwrapped, labeled, frozen and placed in the master case.

For the Dinner Brat process, the procedure can include dumping the pre-rigor lean meat into the holding hopper, and dumping the pre-rigor fat meat into the holding hopper and measuring the fat % of the components. Pre-rigor lean and pre-rigor fat can be added to the final blender targeting about approximately 22% (or in the Range of about approximately 18-50%) Meat Block fat. At this time various seasoning, salt and water can be added. The inputs can be blended for about approximately 1 to 5 minutes and then chilled to about approximately 27° F. (or in the Range about approximately 20°-35° F.). The blended and chilled product can be discharged into a stuffer having an In-line grind to about approximately 2.0 to 4.0 mm. The natural hog casing can be pre-soaked in water overnight. The casings can be placed into warm water prior to stuffing. The product can be stuffed into a 28-37 mm hog casing having a target length of about approximately 5.0" to 7.0" and having a target weight of about approximately 3 oz to 5 oz. The brats can be placed on a tray and overwrapped, labelled and placed in the master case.

Various tests were perform using the disclosed and claimed technology and various observations were noted regarding the test product including total color change over a selected period of time (Delta E), generally calculated as $\Delta E=[(\Delta L^*)2+(\Delta a^*)2+(\Delta b^*)2]^{1/2}$, and color saturation—Chroma C. The following observations were made.

1. Initial steady pH decline beginning 0.75 hours post-mortem. Picnic was higher in pH than Cheek meat. At time 2 hours, a more rapid pH decline begins.
    a. Picnic had a steady pH decline up to 1.5 hours to pH 6.51. Had a few outstanding data points before stabilizing at pH range of 6.56-6.62
    b. Cheek meat had a steady pH decline up to 1 hour to pH 6.39. Rapid decline began at 2 hours from 6.42-6.19 at 4 hours post-mortem.
2. Initial rise in meat temperature at 1 hour, then steady decline until temperature equilibrium is reached.
    a. Picnic temperature equilibrium at 1.5 hours and 87-93° F.
    b. Cheek meat temperature equilibrium at 1.5 hours and 83-86° F.
    c. Temple temperature equilibrium at 1.5 hours and 81-85° F.
    d. Head Back temperature equilibrium at 1.5 hours and 81-86° F.
    e. Pate temperature equilibrium at 2.5 hours and 79-80° F.
    f. Trace Lean temperature equilibrium at 2.5 hours and 82-83° F.
3. Initial increase in L* values then a slow decline of values exhibited up to 4 hours post-mortem.
    a. Picnic had an increase in L* value at 1 hour to 53.77 then steady decline to 46.84 at 4 hours post-mortem.
    b. Cheek meat had an increase in L* value at 1.5 hours to 51.86 then a steady decline to 47.56 at 4 hours post-mortem.
4. Initial decline in a* values then a slow increase of values exhibited up to 3.5 hours post-mortem.
    a. Picnic had a decrease in a* value at 1.5 hour to 16.55 then steady incline to 19.29 at 3.5 hours post-mortem.
    b. Cheek meat had an increase then decrease in a* value at 1.5 hours to 15.69 then a steady incline to 19.39 at 3.5 hours post-mortem.
5. Initial increase in b* values then a rapid decline to 1.5 hours and stabilization to 4 hours post-mortem.
    a. Picnic had an increase in b* value at 1 hour to 14.73 then declined to 12.37 at 4 hours post-mortem.
    b. Cheek meat had an increase in b* value at 1 hour to 14.83 then declined to 13.47 at 4 hours post-mortem.
6. Initial decrease in ΔE values to 1 hour and stabilization to 4 hours post-mortem.
    a. Picnic had a decrease in ΔE value at 1 hour to 11.92 indicating at 1 hour post-mortem the color of picnics is closest to the target.
    Following the suggested +2.3 for just noticeable difference in ΔE by the human eye, Picnic can be collected for up to 3 hours post-mortem and be within this range.
    b. Cheek meat had a decrease in ΔE value at 1 hour to 13.33 indicating at 1 hour post-mortem the color of cheeks is closest to the target.
    Following the suggested +2.3 for just noticeable difference in ΔE by the human eye, Cheek can be collected for up to 1.5 hours post-mortem and be within this range.
7. Chroma values indicate the intensity of the principle hue in the product. A higher number indicates more intensity.
    a. Picnic had an increase in Chroma value at 1.5 hours and began a slow decline in value to 3.5 hours post mortem. Optimal hue intensity occurs at 1.5 and 4 hours.
    b. Cheek meat had a decrease in Chroma value at 1 hour and began a rapid incline to a maximum value at 1.5 hours. Optimal hue intensity occurs at 1.5 hours.
8. ΔL* values are an indication of how far the sample deviates from the target color when reviewing white/black.
    a. At 1.5 hours, the Picnic sample had a ΔL* score of −4.19 indicating this is the optimal time for L* value of picnics to be the closest to target.
    b. At 1.5 hours, the cheek meat sample had a ΔL* score of −6.59 indicating this is the optimal time for L* value of picnics to be the closest to target.
9. Δa* values are an indication of how far the sample deviates from the target color when reviewing green/red.
    a. At 3.5 hours, the Picnic sample had a Δa* score of −6.38 indicating this is the optimal time for a* value of picnics to be the closest to target. This may indicate oxygenation of the muscle.

b. At 3.5 hours, the cheek meat sample had a Δa* score of −6.28 indicating this is the optimal time for a* value of picnics to be the closest to target. This may indicate oxygenation of the muscle.

10. Δb* values are an indication of how far the sample deviates from the target color when reviewing blue/yellow.

a. At 1 hour, the Picnic sample had a Δb* score of −7.45 indicating this is the optimal time for b* value of picnics to be the closest to target.

b. At 1 hour, the cheek meat sample had a Δb* score of −8.15 indicating this is the optimal time for b* value of picnics to be the closest to target.

The various implementations of the method shown above illustrate a method for processing pork sausage from a butcher hog; barrow (a male pig that has been castrated) or gilt (female pig less than six months old that has never been pregnant), (a pig approximately 285 lbs live weight, 6 months old and ready for market with no abnormalities). A user of the present technology may choose any of the above implementation, or an equivalent thereof, depending upon the desired application. In this regard, it is recognized that various forms of the subject process for the manufacture of pre-rigor sausage could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A method for manufacturing sausage comprising the steps of:
   hot bone harvesting pre-rigor lean from portions of a butcher hog where the portions include one or more of a cheek meat portion, pate portion, temple portion and head back portion;
   hot bone harvesting pre-rigor fat from portions of a butcher hog where the portions include one or more of a temple portion, head back portion, and pate portion; and
   chopping and blending the harvested pre-rigor lean and the harvested pre-rigor fat in desired proportions one with respect to the other forming a sausage blend.

2. The method for manufacturing sausage as recited in claim 1, further comprising the step of:
   chilling the sausage blend.

3. The method for manufacturing sausage as recited in claim 2, where the hot bone harvested pre-rigor lean and the hot bone harvested pre-rigor fat are blended for about 3 minutes and the sausage blend is chilled to about 27° F.

4. The method for manufacturing sausage as recited in claim 1, where the hot bone harvested pre-rigor lean is at a temperature at about 94° to 105° F. when being hot bone harvested.

5. The method for manufacturing sausage as recited in claim 1, where the hot bone harvested pre-rigor fat is at a temperature at about 87° to 93° F. when being hot bone harvested.

6. The method for manufacturing sausage as recited in claim 1, where the hot bone harvested pre-rigor lean is at a temperature at about 88° to 95° F. when being chopped.

7. The method for manufacturing sausage as recited in claim 1, where the hot bone harvested pre-rigor fat is at a temperature at about 83° to 88° F. when being chopped.

8. The method for manufacturing sausage as recited in claim 1, where the hot bone harvested pre-rigor lean comprises about 50% cheek meat.

9. The method for manufacturing sausage as recited in claim 1, where the hot bone harvested pre-rigor fat comprises about 21.2% head back and about 24.8% temple.

10. The method for manufacturing sausage as recited in claim 1, where the sausage blend can have about 22% to 34% Meat Block Fat.

11. The method for manufacturing sausage as recited in claim 1, where the harvested pre-rigor lean and the harvested pre-rigor fat are chopped until reduced to a size of about ½ inch.

12. The method for manufacturing sausage as recited in claim 11, where the sausage blend is discharged into a stuffer having an in-line grind to 3.5 mm.

13. The method for manufacturing sausage as recited in claim 1, where the sausage blend can be about 10% to about 28% RTU fat.

14. The method for manufacturing sausage as recited in claim 1, where salt is added at the chopping step.

15. The method as recited in claim 14, where a target meat block fat of the sausage blend is in the range of about approximately 18-26%.

16. The method as recited in claim 14, where a target meat block fat of the sausage blend is in the range of about approximately 20-40%.

* * * * *